UNITED STATES PATENT OFFICE.

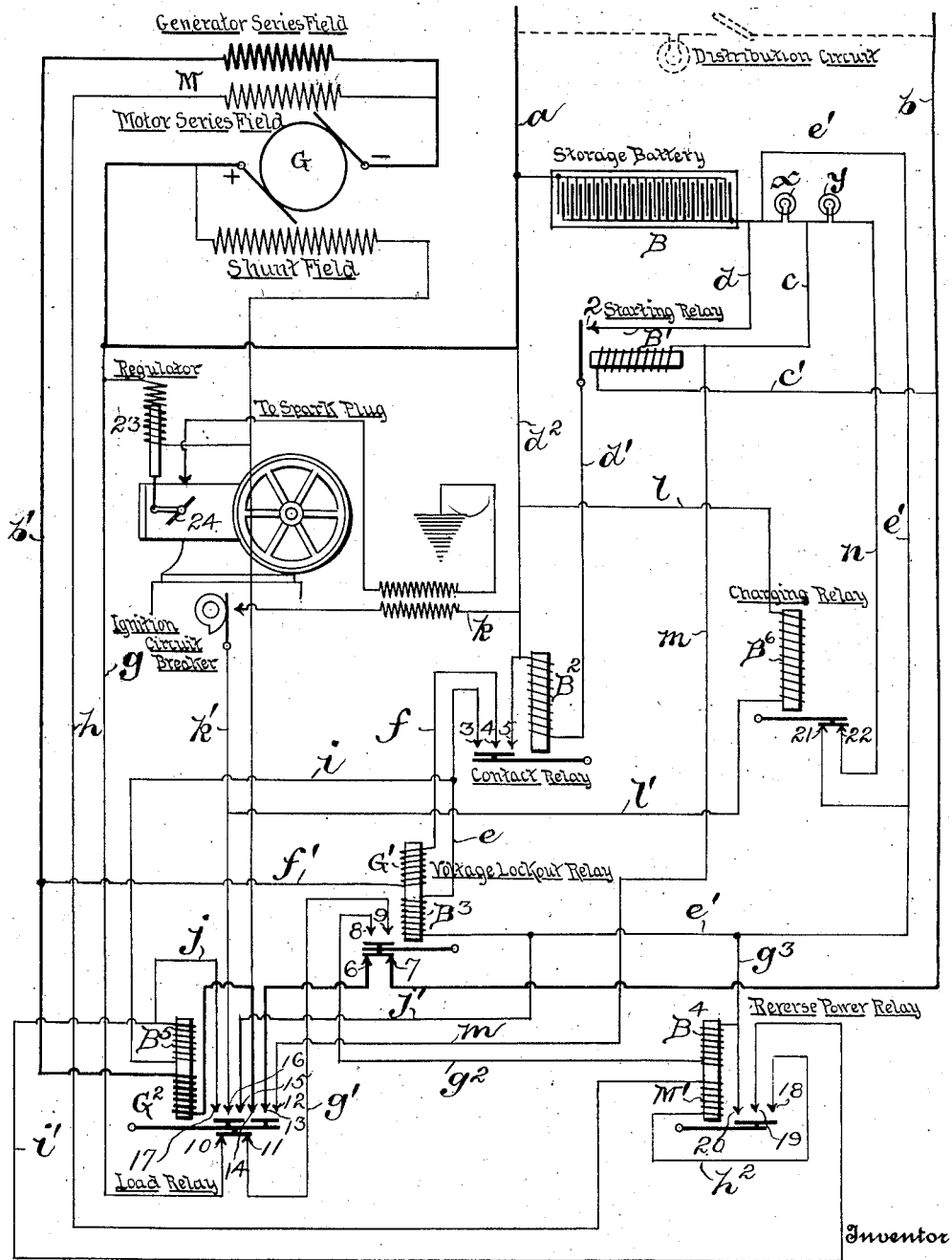

EVERETT P. LARSH, OF DAYTON, OHIO, ASSIGNOR TO THE BURNETT-LARSH MANUFACTURING COMPANY, OF DAYTON, OHIO, A CORPORATION OF OHIO.

ELECTRIC SYSTEM.

1,347,546.	Specification of Letters Patent.	Patented July 27, 1920.

Application filed June 21, 1915. Serial No. 35,390.

*To all whom it may concern:*

Be it known that I, EVERETT P. LARSH, a citizen of the United States, residing at Dayton, in the county of Montgomery and State of Ohio, have invented certain new and useful Improvements in Electric Systems, of which the following is a specification.

My invention relates to electrical systems and more particularly to an automatic generating system adapted to be set in operation by the closing of the distribution circuit.

The object of the invention is to simplify the structure as well as the means and mode of operation of such systems whereby they will not only be cheapened in construction, but will be more efficient in operation, entirely automatic, positive in action, and unlikely to get out of repair.

A further object of the invention is to provide in such a system a generator capable of being initially operated from a low voltage battery for the purpose of cranking or starting the prime mover.

A further object is to provide in such a system means for automatically recharging the battery discharged in starting from the generator which it has previously energized and for safe guarding and protecting the sundry circuits by means of coacting relays and armatures.

A further object of the invention is to provide in an automatic generating system a series of interlocking circuits designed to cut out certain coils or relays and circuits before the others are caused to operate and to avoid possible short circuiting of the system.

With the above primary and other incidental objects in view, as will more fully appear in the specification, the invention consists of the features of construction, the parts and combinations thereof, and the mode of operation, or their equivalents, as hereinafter described and set forth in the claims.

The drawing is a diagrammatic view of the automatic generating system forming the subject matter hereof.

The automatic system herein described embodies a generator connected to and driven by an explosive engine as now commonly employed. The generator is provided with two series field windings, first the ordinary generator series field winding, and second a motor series field winding by means of which the generator may be operated at low voltage from a storage battery for the purpose of initial cranking the explosive engine. The low voltage storage battery employed is connected across the distribution line in series with a starting relay which is energized from the battery by the closing of the distribution circuit either by means of a switch, a lamp, or other current consuming connections, to cause the closing of a succession of circuits whereby current from the storage battery is connected through the low voltage or motor series windings of the generator to cause the generator to operate as a motor to crank or start the explosive engine.

As the explosive engine comes into operation the direction of power is reversed and the explosive engine becomes the driver and the generator the driven element thereby allowing the latter to build up as a compound generator. The potential of the generator increases until the electro motive force thereof exceeds that of the storage battery, whereupon the direction of flow of the current will be reversed causing the operation of various relays and armatures to supply current direct to the distribution circuit from the generator and to recharge the storage battery preparatory to the next starting operation.

In the diagram the circuits have been shown in normal condition, the explosive engine being at rest and the storage battery fully charged.

Referring to the diagram, $a$ and $b$—$b'$ are the main lines leading to the distribution system. For convenience in identifying analogous parts, the motor series field winding has been indicated by M, the generator series field by G, and the storage battery by B. The relays responsive to each of these elements have been correspondingly indicated with exponents indicating the order in which these relays are energized.

The main line $a$ is connected to the positive side of the generator G while the line $b$—$b'$ is connected to the negative side thereof. The line $b$—$b'$ is divided into two sections by make and break contacts as hereafter described, the separate parts being indicated by $b$—$b'$.

The storage battery B is bridged across these lines, being connected at one side directly to the line $a$ and at the opposite side through the line $c$ to the starting relay B' and thence through the line $c'$ to the main line $b$. It is to be noted that a lamp $x$ is included in the line $c$ for the purpose of controlling the charging of the battery B.

The starting relay B' being thus connected across the line and energized from the storage battery by the lighting of a lamp or closing of a switch in the distribution system, attracts its armature and closes the contact 2 whereby the current is caused to pass from the storage battery through the line $d$ to the contact 2, then through the line $d'$ to the contact relay $B^2$ and then through the line $d^2$ to the main line $a$, completing the circuit whereby the contact relay $B^2$ is energized by current from the battery B.

When thus energized the relay $B^2$ attracts its armature and thereby closes three contacts 3, 4, and 5. The closing of contacts 3 and 4 closes independent circuits through the differential windings $B^3$, G', respectively, of the voltage lock out relay. The circuit which includes the winding $B^3$ is a battery circuit whereby the winding $B^3$ is connected across the battery. The winding $B^3$ is thus immediately energized under battery influence. To the contrary, the circuit which includes the winding G' connects said winding across the generator which, at the time of the operation of the relay $B^2$ is idle. This circuit in which the winding G' is included connects with only one side of the battery, viz: the side $a$. Therefore, being connected at one side only of the battery and the generator being idle, no current will flow through the winding G' until the generator is started. The windings G' and $B^3$ are arranged in opposition one to the other whereby the coil G' will neutralize the effect of the coil $B^3$, permitting the retraction of the armature.

Upon the closing of the contacts 3 and 5, battery current passes through the line $d^2$ to the contact 5, then to the contact 3, through the line $e$ to the winding $B^3$ and completes the circuit through the line $e'$ to the opposite side of the battery B. The winding $B^3$ is thus connected across the battery.

The winding G' is brought into circuit by the closing of the contact 4 and is bridged across the terminals of the generator in a circuit extending from the main line $a$ through the line $d^2$ to the contact 5, thence to the contact 4 and through the line $f$ to the winding G' and thence through the line $f'$ to the section $b'$ of the main line which is connected to the opposite side of the generator.

The attraction of the armature by the lockout relay under the influence of the winding $B^3$ by the battery current through the circuits $d^2$, $e$ and $e'$, as before described, closes contacts 8 and 9.

The coils G' and $B^3$ are differentially wound and so proportioned that the relay will not close contacts 8 and 9 until the generator voltage decreases to a predetermined point, for instance fifteen volts, and will not again open contacts 8 and 9 until the generator voltage increases to a predetermined higher point, for example one hundred and twenty volts, the normal voltage being assumed to be one hundred and twenty-five volts.

The closing of these contacts 8 and 9 by the lock out relay closes the battery circuit through the winding $B^4$ of the reverse power relay. The battery circuit then passes from the main line $a$ through the line $g$ to the contacts 10 and 11 which are connected one to the other by the armature of the load relay when the latter is in normal or deenergized position, thence through the line $g'$ to the contact 9 which is closed with contact 8 by the armature of the lock out relay, thence through the line $g^2$ to the winding $B^4$ of the reverse power relay which is connected through $g^3$ with the line $e'$ leading to the opposite side of the battery.

The reverse power relay being energized under the influence of the winding $B^4$ attracts its armature and closes the contacts 18, 19 and 20 thereby bridging the generator armature and the special low voltage motor series field windings of the generator across the battery circuit. The current then passes from the storage battery B through the main line $a$ to the generator armature and through the special low voltage motor series field winding M, thence through the line $h$ to the winding M' of the reverse power relay and through the line $h^2$ to the contact 18, closed with the contact 20 by the armature, and thence through the line $g^3$ and line $e'$ to the opposite side of the battery.

The coil M' of the reverse power relay is thus connected in series with the motor and battery and tends to hold the contacts 18, 19, and 20 closed independent of the battery winding $B^4$. The resistance of the power relay armature is such that the relay will open when the current passing through the coil M' decreases to a predetermined value, for instance five amperes, corresponding to a motor speed greater than that attained while driving the explosive engine against friction and compression during the initial cranking or starting operation.

The generator armature and the special low voltage motor series field winding M being thus connected in circuit with the storage battery B, the generator is operated as a motor and the explosive engine is driven at cranking speed by this accumulative compound motor, the shunt field of which is so weak that the characteristic is prevailingly series.

The closing of the contact 19 by the reverse power relay energizes the winding $B^5$ of the load relay by closing the circuit through the line $d^2$ from the main line $a$, thence through the contacts 5 and 3 and line $i$ to the winding $B^5$ of the load relay, thence through the line $i'$ to the contact 19, closed with contact 20, through the line $g^3$ and $e'$ to the opposite side of the battery.

The operation of the load relay under the influence of the coil $B^5$ opens the line $g$—$g'$ between the contacts 10 and 11 thereby opening the circuit of the coil $B^4$ of the reverse power relay. The armature thereof is then maintained in closed position solely under the influence of the coil $M'$ which releases the armature, as before mentioned, when the explosive engine ignites its charges and tends to accelerate its speed, thereby reversing the direction of power transmission between the engine and generator.

The closing of the load relay armature, under the influence of the winding $B^5$, serves to bridge said winding $B^5$ across the battery circuit independent of the line $i'$ and the reverse power relay. This is accomplished through the line $j$ and contacts 17 and 15 closed by the armature of the load relay, thence through the line $j'$ to the line $e'$ and to the opposite side of the battery. The load relay is thus maintained under the influence of the battery current and the opening of the reverse power relay, as before described, merely disconnects the battery from the special low voltage motor series field windings of the generator and allows the latter to build up as a shunt generator.

The operation of the load relay armature, closing contacts 15 and 16, brings into circuit the ignition devices of the explosive engine and also a charging relay $B^6$. The ignition circuit passes from the battery through the line $a$, thence through the line $d^2$ to the line $k$ and through the spark coil to the circuit breaker, and thence through the line $k'$ to the contact 16 which is connected with contact 15 by the armature and thence through line $j'$ to the line $e'$ and to the opposite side of the battery.

The load relay armature, acting under the influence of the winding $B^5$ has at the same time closed a second series of contacts 12, 13 and 14. By closing the contacts 12 and 14 the generator and its accumulative series field are temporarily connected across the distribution system through the line $b'$ to the winding $G^2$ of the load relay, thence to the contact 14 closed with contact 12 and through line $m$ to the starting relay $B'$ and thence through line $c'$ to the section $b$ of the main line.

When the generator voltage reaches a predetermined point, for example one hundred and twenty volts in a one hundred and twenty-five volt system, the winding $B^3$ of the voltage lock out relay is neutralized by the influence of the winding $G'$ and the retraction of the armature operates to break the contacts 8 and 9 and close contacts 6 and 7. The main line sections $b$ and $b'$ are thus connected through the contacts 6 and 7 excluding the starting relay $B'$ from the circuit. The contacts 13 and 14 in the main line $b$ having been previously connected by the operation of the load relay, the main line is thus completed.

The generator current is raised to its normal value which, with a load on the distribution system or the charging lamp $y$ maintained in circuit, is sufficient to hold the load relay closed under the influence of the winding $G^2$ independent of the battery winding $B^5$. The coil or winding $B^5$ is de-energized by the release of the voltage lock out relay armature which opens the contacts 8 and 9 and short circuits the starting relay $B'$ through contacts 12 and 13. The opening of contact 2 disconnects relay $B^2$, and the breaking contacts 3 and 5 by said relay $B^2$ disconnects winding $B^5$ of the load relay leaving the latter relay maintained solely by coil $G^2$ under influence of the generator.

The load relay remains closed under the influence of the winding $G^2$ and the explosive engine continues to drive the generator to supply current to the distribution system so long as there is any load on the distribution line or so long as the charging lamp $y$ remains in the circuit. The charging lamp $y$ is controlled through the contacts 21 and 22 by the charging relay $B^6$.

The charging relay $B^6$ is energized by the battery through the line $l$ from the line $d^2$ to the relay $B^6$ and thence through the line $l'$ to the line $k'$, thence through the contacts 16 and 15 and line $k^2$ to the line $e'$ leading to the opposite side of the battery. When the relay $B^6$ is energized by battery current sufficiently to overcome the resistance of its armature, which will only occur when the battery is fully charged, the contacts 21—22 are opened and the lamp $y$ is excluded from the circuit.

The charging lamp $x$ is of such capacity as to permit the passing of current to the battery $B$ slightly in excess of that required by the ignition circuit. This lamp $x$ is permanently bridged in series with the storage battery $B$ and the starting relay $B'$ across the terminals of the generator through the lines $c$ and $c'$. The charging relay $B^6$ is connected as before described across the battery circuit and normally holds the contacts 21 and 22 open. However, when the battery voltage drops, due to the use of current for starting, control current, etc., whereby the influence of the charging relay falls below the tension of its armature spring, the contacts 21 and 22 are closed by the charging relay armature, thereby closing the circuit through the line $n$ and reconnecting the charging lamp y in parallel with the lamp x until the battery is fully charged, whereupon the charging relay B⁶ by attraction of its armature will open the contacts 21 and 22, thereby again disconnecting the line n and lamp y.

In order that the armatures of the several relays B¹, B², B³—G′, B⁴—M′, B⁵—G² and B⁶ may be promptly retracted upon their release by the respective magnets, and may resist attraction until the operating current attains sufficient voltage, the armatures may be weighted whereby their retractive movement will occur under the influence of gravity or each armature may be provided with a retracting spring as is common in electromagnet constructions.

If the distribution circuit is closed for only a short time sufficient to cause the operation of the system to start the engine and generator and is then immediately opened or the light in the distribution system turned off, the engine and generator will continue to operate until the battery which was discharged in starting the engine and generator is fully recharged. Thus the connections between the battery and the generator, having been established by the closing of the distribution circuit, are thereafter maintained independent of the distribution circuit until the completion of the recharging period.

In addition to the system of automatic electrical control described, there is provided an electrical regulator or governor for the prime operator or engine comprising a solenoid 23 bridged across the shunt field of the generator. The movable core of this solenoid is connected with a control valve 24 of the engine which may be the valve supplying fuel to the engine but is preferably the valve controlling the supply of air to the explosive mixture. The construction is such that fluctuations in the generator potential will automatically vary the adjustment of the valve. Increases in the potential of the generator will tend to close the engine valve and a decrease of potential will tend to open said valve whereby the engine and generator will be automatically maintained in balanced relation one with the other.

It is to be noted that the system herein described is entirely automatic in its operation and is controlled solely by the turning off and on of a lamp or other current consuming element in the distribution system. Inasmuch as the control is automatic and the several elements are interdependent one upon the other, the necessity for expensive instruments such as indicators, gages and meters is obviated and the operation of the system is entirely within the power of persons unskilled in electrical science.

From the above description it will be apparent that there is thus provided a device of the character described possessing the particular features of advantage before enumerated as desirable but which is obviously susceptible of modification in its form, proportion, detail construction, or arrangement of parts without departing from the principle involved or sacrificing any of its advantages.

While in order to comply with the statute the invention has been described in language more or less specific as to certain structural features, it is to be understood that the means and construction herein described comprise but one mode of putting the invention into effect and the invention is therefore claimed broadly in any of its possible forms or modifications within the scope of the appended claims.

Having thus described my invention, I claim:

1. In an electrical system as described, a distribution circuit, a generator adapted to normally supply current to the distribution circuit, a special low voltage motor field winding in said generator, an explosive engine adapted to normally drive the generator, a battery of lower voltage than the normal operating voltage of the generator, said battery being recharged after each starting operation hereafter mentioned by said generator preparatory to the succeeding starting operation, and normally open electrically operated switches intermediate the generator, battery and distribution line and means whereby the initial closing of the distribution circuit will automatically connect the said special low voltage motor series field winding of the generator with the low voltage battery to drive said generator as a motor to initially operate the explosive engine.

2. In an electrical system as described, the combination of an explosive engine, a generator normally driven by the engine and supplying current to the hereafter mentioned distribution circuit and battery, for the purpose of recharging said battery preparatory to the next starting operation, a battery of lower voltage than the normal operating voltage of the generator, a special low votage motor series field winding in said generator, a distribution circuit, and normally open intermediate connections automatically actuated by the closing of the distribution circuit by which the battery may be electrically connected with the special low voltage field winding to operate the generator as a motor for the purpose of starting the engine.

3. In an electrical system as described, an explosive engine, a generator actuated thereby, a distribution circuit, a battery bridged across the distribution circuit, a make and break contact intermediate the generator and distribution circuit, an automatically operated control element for said make and break contact common to both the battery and the generator, and intermediate connections whereby the closing of the distribution circuit will automatically close the said contact under the influence of battery current until the potential of the generator exceeds that of the battery and means whereby the contact will thereafter be maintained closed under the influence of the generator current.

4. In an electrical system, a distribution circuit, a generator having a special low voltage series field winding, an engine normally driving the generator, and a battery of lower voltage than the normal operating voltage of the generator connected with the special low voltage series field winding and operating said generator on a voltage substantially lower than the normal operating voltage of the generator to drive the engine at cranking speed, and an automatically operated switch controlled by normal generator current to automatically connect the generator with the distribution circuit.

5. In an electrical system as described, a distribution circuit, a generator, an explosive engine driving the generator to supply current to the distribution circuit, a storage battery charged by said generator, and electrically operated means controlled by current from said battery for stopping the engine upon the opening of the distribution circuit in the event that said battery is fully charged but inoperative for stopping the engine if said battery is not fully charged.

6. In an electrical system as described, a distribution circuit, a generator, a storage battery, an explosive engine driving the generator to supply current to the distribution circuit and to said battery, and an electrical ignition circuit for said engine, electrically operated means for maintaining the ignition circuit closed under the influence of the battery current, and means for interrupting the ignition circuit by the opening of the distribution circuit, said interrupting means being inoperative until said battery is fully charged.

7. In an electrical system as described, a distribution circuit, a generator normally supplying said circuit, an internal combustion engine driving the generator, an ignition circuit for the engine, a battery bridged across the distribution circuit charged by said generator, an electrically operated means common to both the battery and generator for controlling the ignition circuit adapted to be initially operated to close the ignition circuit under the influence of battery current upon the initial closing of the distribution circuit and means whereby said ignition circuit will be maintained closed independent of the condition of the distribution circuit until said battery is fully recharged, and means for opening the ignition circuit when said battery receives its full charge.

8. In an electrical system as described, a distribution circuit, a generator supplying said circuit, a battery bridged across the distribution circuit and charged by said generator, a make and break contact in the distribution circuit intermediate the battery and generator, and electrically controlled means common to both battery and generator initially operated under the influence of the battery current to close said make and break contact upon the closing of the distribution circuit beyond the battery, and maintained in operated condition by generator current subsequent to the opening of the distribution circuit, and means to open said contact subsequent to the opening of the distribution circuit, when said battery has been fully charged.

9. In an electrical system as described, a distribution circuit, a generator supplying the said circuit, a battery bridged across the distribution circuit, a make and break contact in the circuit of said generator, and electrically operated means common to both the battery and generator adapted to close said circuit under the influence of the battery current upon the closing of the distribution circuit, and thereafter maintained in closed condition under the influence of the generator current.

10. In an electrical system as described, a distribution circuit, a generator supplying the circuit, a battery bridged across the distribution circuit, a make and break contact in the distribution circuit intermediate the generator and battery, electrically operated means common to both battery and generator controlling the make and break contact adapted to be initially energized upon the closing of the distribution circuit, and a second circuit adapted to neutralize the effect of the closing of the distribution circuit whereby said electrically operated means will be rendered ineffective thereby permitting the return of the make and brake contact to normal condition.

11. In an electrical system as described, a distribution circuit, a generator supplying the circuit, a battery bridged across the distribution circuit, a make and break contact in the distribution circuit intermediate the generator and battery, electrically operated means common to both battery and generator controlling the make and break contact influenced by battery current upon the closing of the distribution circuit through the battery to open said make and break contact and thereafter influenced by the generator current to effect the closing of the said make and break contact.

12. In an electrical system, as described, a distribution circuit, a generator supplying said circuit, a low voltage motor winding in said generator, a storage battery of lower voltage than the normal operating voltage of the generator bridged across the distribution circuit, a relay also bridged across the distribution circuit in series with said battery and energized by battery current upon the closing of the distribution circuit, a second relay electrically connected with said battery by the operation of the first mentioned relay, a battery circuit and a generator circuit both closed by the operation of said second relay, a double wound relay the windings of which are so arranged that the influence of one winding will neutralize that of the other winding, one of said windings being in said battery circuit and the other winding being in the generator circuit closed by said second relay, a second double wound relay one winding of which is brought into the battery circuit by the operation of the first mentioned double wound relay acting under the influence of battery current, the other winding of which is adapted to be brought into the battery circuit in series with the motor winding of the generator by the operation of said last mentioned relay under the influence of battery current through the first mentioned winding, and a third double wound relay one winding of which is electrically connected with the battery by the operation of the second mentioned double wound relay, the other winding of which is in circuit with the generator, substantially as and for the purpose specified.

13. In an electrical system as described, a distribution circuit, a generator supplying said circuit, a low voltage motor winding in said generator, a prime operator driving the generator, a battery adapted to receive current from the generator, means for electrically connecting the battery with the motor winding of the generator upon the closing of the distribution circuit, and electrically operated means under the control of the battery for maintaining the battery and generator in a closed circuit independent of the distribution circuit until the battery is fully charged.

14. In an electrical system as described, a distribution circuit, a generator supplying current to the said circuit, a battery supplied by said generator, means for electrically connecting the battery with the generator upon the closing of the distribution circuit, and electrically operated means controlled by battery current for maintaining the connection between the battery and generator subsequent to the opening of the distribution circuit.

15. In an electrical system as described, a combined motor and generator comprising motor field windings and generator field windings, an armature common to both windings, an explosive engine driving the generator, a distribution circuit supplied by the generator, and a battery of lower voltage than the normal operating voltage of the generator charged by said generator and subsequently operating said generator through the motor field windings thereof to drive said engine at cranking speed, and means for maintaining the battery in the circuit with said generator until fully recharged and for disconnecting said battery from the generator when recharged independent of the opening or closing of the distribution circuit.

In testimony whereof, I have hereunto set my hand this 15th day of June, A. D. 1915.

EVERETT P. LARSH.

Witnesses:
ALFRED McCRAY,
F. L. WALKER.